United States Patent
Holzapfel et al.

(10) Patent No.: US 10,527,405 B2
(45) Date of Patent: Jan. 7, 2020

(54) OPTICAL POSITION-MEASURING DEVICE

(71) Applicant: DR. JOHANNES HEIDENHAIN GmbH, Traunreut (DE)

(72) Inventors: Wolfgang Holzapfel, Obing (DE); Karsten Saendig, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 16/154,750

(22) Filed: Oct. 9, 2018

(65) Prior Publication Data

US 2019/0120609 A1    Apr. 25, 2019

(30) Foreign Application Priority Data

Oct. 25, 2017   (DE) ................ 10 2017 219 125

(51) Int. Cl.
*G01B 11/02* (2006.01)
*G01D 5/34* (2006.01)
*G01D 5/347* (2006.01)

(52) U.S. Cl.
CPC .......... *G01B 11/026* (2013.01); *G01D 5/344* (2013.01); *G01D 5/34715* (2013.01)

(58) Field of Classification Search
CPC ... G01B 11/026; G01D 5/344; G01D 5/34715
USPC ................................................ 356/614–640
See application file for complete search history.

(56) References Cited

U.S. PATENT DOCUMENTS

| 5,974,464 | A | 10/1999 | Shin et al. |
| 7,573,581 | B2 | 8/2009 | Holzapfel |
| 7,733,918 | B2 | 6/2010 | Poimboeuf et al. |
| 8,730,485 | B2 | 5/2014 | Van Der Pasch et al. |
| 9,733,069 | B2 | 8/2017 | Holzapfel |
| 2007/0271805 | A1* | 11/2007 | Holzapfel ................ G01D 5/36 33/707 |
| 2015/0070711 | A1 | 3/2015 | Holzapfel |

FOREIGN PATENT DOCUMENTS

| DE | 69626211 T2 | 2/2004 |
| DE | 102015203188 A1 | 8/2016 |
| EP | 1762828 A2 | 3/2007 |
| EP | 2848899 A2 | 3/2015 |

* cited by examiner

*Primary Examiner* — Tri T Ton

(74) *Attorney, Agent, or Firm* — Leydig, Voit & Mayer, Ltd.

(57) ABSTRACT

An optical position-measuring device for sensing a position of two relatively movable objects includes a scale connected to one object and having a measuring graduation. A scanning unit is disposed on the other object and has optical elements. An arrangement and design of the optical elements of the scanning unit results in a scanning beam path in which split and subsequently interfered sub-beams propagate mirror-symmetrically with respect to a plane of symmetry and either impinge on and/or are reflected back from the scale in a V-shape. The plane of symmetry is tilted by a defined tilt angle relative to the scale about an axis of rotation that is oriented parallel to a surface of the scale and extends perpendicular to the graduation direction. The sub-beams that are interfered are deflected at the measuring graduation into symmetric diffraction orders. The sub-beams travel identical optical path lengths between splitting and recombination.

15 Claims, 9 Drawing Sheets

OPTICAL POSITION-MEASURING DEVICE

CROSS-REFERENCE TO PRIOR APPLICATION

Priority is claimed to German Patent Application No. DE 10 2017 219 125.2, filed on Oct. 25, 2017, the entire disclosure of which is hereby incorporated by reference herein.

FIELD

The present invention relates to an optical position-measuring device for sensing the position of two relatively movable objects.

BACKGROUND

Typically, in known position-measuring devices for sensing the position of two relatively movable objects, the position of a scanning unit relative to a scale is determined along at least one measurement direction. A measuring graduation is arranged on the scale along a graduation direction which corresponds to the measurement direction. The scanning unit and the scale are each connected to a respective one of the two movable objects. In known devices, the "sensitivity vector" of the position-measuring device, which denotes the respective effective measurement direction, is typically oriented parallel to the surface of the scale.

Also known are position-measuring devices whose sensitivity vector is oriented obliquely to the surface of a scale having a reflective measuring graduation. In this regard, reference is made, for example, to the Applicant's European Patent Application EP 1 762 828 A2. In a position-measuring device of this type, the inclined orientation of the sensitivity vector is ensured by an asymmetric configuration of the interferential scanning beam path. In such scanning beam paths, an incident beam is split into at least two sub-beams which are finally brought into interfering superposition. With such position-measuring devices, it is possible to obtain position information with respect to relative movement between the scanning unit and the scale both along a lateral measurement or displacement direction and along a vertical measurement or displacement direction. This means that such position-measuring devices can be used to measure changes in position along two degrees of freedom in translation. In such a position-measuring device, the path lengths of the interfering sub-beams are usually equal only at a certain nominal scanning distance between the scanning unit and the scale. If the scale or the scanning unit is moved out of the respective normal scanning distance, then the optical path lengths traveled by the interfering sub-beams will be different. Thus, a possible change in the wavelength of the light source used affects the phase of the interfering sub-beams, and thus also the determined position information. The scanning optical systems of such position-measuring devices are therefore referred to as chromatic or wavelength-dependent. Therefore, the light source used therein must have a sufficient coherence length and extremely low phase noise. To ensure this, such a light source must be stabilized in a complex fashion, which makes it correspondingly expensive.

The Applicant's German Patent Application DE 10 2015 203 188 A1 describes a further optical position-measuring device which is capable of acquiring position information with respect to relative movement between the scanning unit and the scale both along a lateral measurement or displacement direction and along a vertical measurement or displacement direction. Here, the scanning optical system is tilted by a certain tilt angle relative to the scale about an axis of rotation that is oriented parallel to the surface of the scale and extends perpendicular to the grating vector of the measuring graduation. In order to provide an asymmetric interferential scanning beam path configuration, provision is made not only to select a suitable tilt angle relative to the scale, but also to use, for signal generation, sub-beams resulting from non-symmetric diffraction orders at the measuring graduation such as, for example, the $+3^{rd}/-1^{st}$ diffraction orders or the $+1^{st}/0^{th}$ diffraction orders. However, the use of such diffraction orders is problematic in that the resulting signal intensity and/or mounting tolerance are/is too low.

FIG. 2 of U.S. Pat. No. 8,730,485 B2 illustrates another optical position-measuring device for measuring changes in position along two degrees of freedom in translation. This device employs a beam that is obliquely incident on the measuring graduation and uses the $+1^{st}/-1^{st}$ diffraction orders at the measuring graduation for signal generation, thereby avoiding the problems of the aforementioned publication. However, the optical paths resulting for the sub-beams split at the measuring graduation differ in length between splitting and recombination. This in turn makes the position measurement dependent on wavelength fluctuations.

SUMMARY

In an embodiment, the present invention provides an optical position-measuring device for sensing a position of two relatively movable objects. The optical position-measuring device includes a scale connected to one of the two objects and having a measuring graduation including a periodic arrangement of graduation regions along at least one graduation direction. A scanning unit is disposed on the other one of the two objects and has a plurality of optical elements. An arrangement and design of the optical elements of the scanning unit results in a scanning beam path in which split and subsequently interfered sub-beams propagate mirror-symmetrically with respect to a plane of symmetry and either impinge in a V-shape on the scale and/or are reflected back in a V-shape from the scale. The plane of symmetry is tilted by a defined tilt angle relative to the scale about an axis of rotation that is oriented parallel to a surface of the scale and extends perpendicular to the graduation direction. The sub-beams that are interfered are deflected at the measuring graduation into symmetric diffraction orders. The sub-beams travel identical optical path lengths between splitting and recombination.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
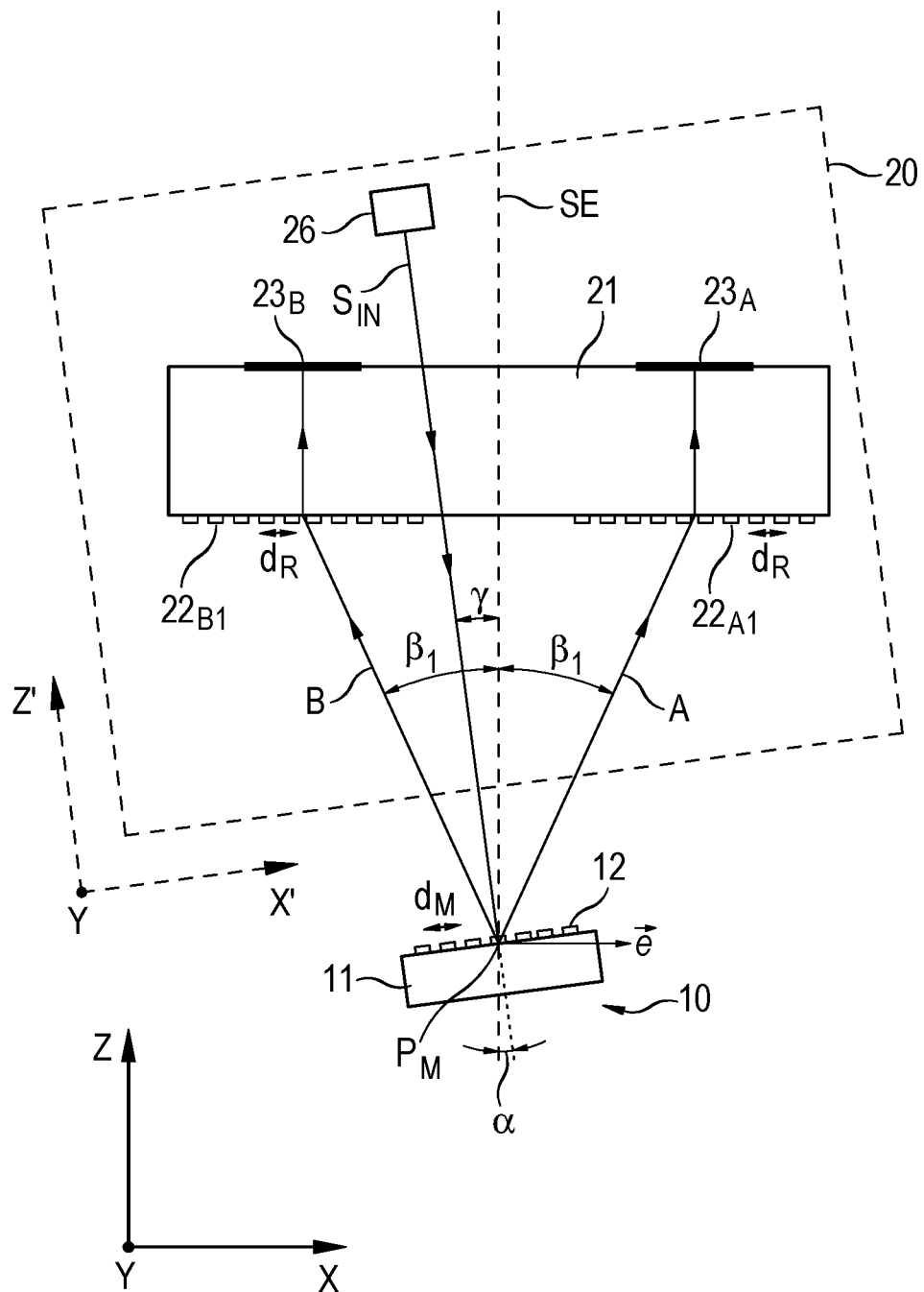
FIGS. 1a-1c are schematic cross-sectional views of a first exemplary embodiment of the inventive optical position-measuring device with an inclined sensitivity vector.

In an embodiment, the present invention provides an optical position-measuring device that has an inclined sensitivity vector, is insensitive to wavelength variations at all permissible scanning distances, has a high signal efficiency and allows for maximum possible mounting tolerances.

According to an embodiment, the inventive position-measuring device for sensing the position of two relatively movable objects includes, on the one hand, a scale connected to one of the two objects and having a measuring graduation including a periodic arrangement of graduation regions along at least one graduation direction. On the other hand, a scanning unit having a plurality of optical elements is disposed on the other object, the arrangement and design of the optical elements of the scanning unit resulting in a scanning beam path in which the split and subsequently interfered sub-beams propagate mirror-symmetrically with respect to a plane of symmetry and either impinge in a V-shape on the scale and/or are reflected back in a V-shape from the scale. The plane of symmetry is tilted by a defined tilt angle relative to the scale about an axis of rotation that is oriented parallel to the surface of the scale and extends perpendicular to the graduation direction. The sub-beams that are interfered are ones which are deflected at the measuring graduation into symmetric diffraction orders and travel identical optical path lengths between splitting and recombination.

Preferably, sub-beams resulting from the $+1^{st}$ and $-1^{st}$ diffraction orders at the measuring graduation are interfered.

The measuring graduation may take the form of a reflection phase grating that is optimized for high diffraction efficiency of the diffraction orders that are used for signal generation.

Furthermore, the angle of incidence of a beam impinging on the measuring graduation with respect to the plane of symmetry may be selected such that identical optical path lengths are obtained for the sub-beams between splitting and recombination thereof.

The scanning unit may include at least one scanning reticle having a plurality of optical elements, the scanning reticle being disposed perpendicular to the plane of symmetry.

Moreover, the angle of incidence of a beam impinging on the measuring graduation with respect to the plane of symmetry may be selected as:

$$\gamma = \sin^{-1}\left(\sqrt{1 - \frac{k^2}{1 - \sin(\alpha)^2}} \cdot \sin(\alpha)\right) + \alpha$$

where:
$\gamma$:=angle of incidence of a beam impinging on the measuring graduation with respect to the plane of symmetry
$k := \lambda/d_M$
$\lambda$:=light wavelength
$d_M$:=graduation period of the measuring graduation
$\alpha$:=tilt angle of the measuring graduation with respect to the plane of symmetry Furthermore, a scanning reticle disposed in the scanning unit may be transparent, two first and two second scanning gratings being provided on its side facing the scale, and two reflectors being provided on the opposite side, the reflecting surfaces of the reflectors being oriented toward the scale.

The scanning unit may be configured such that:
a beam emitted by the light source strikes the measuring graduation, where it is split into two sub-beams that correspond to two different symmetric diffraction orders and are reflected back in a V-shape to the scanning unit, in the scanning unit, the two reflected-back sub-beams pass through the two first scanning gratings toward the two reflectors, and in so doing, experience a deflection effect oriented anti-parallel to the direction of incidence as well as only a focusing effect perpendicular to the graduation direction, the sub-beams so deflected and focused then impinge on the respective reflectors and are reflected back toward the scale, the two reflected-back sub-beams then pass through the two second scanning gratings toward the scale, and in so doing, experience a deflection effect in the graduation direction as well as only a collimating effect perpendicular to the graduation direction, so that the two sub-beams then propagate in a V-shape toward the scale, where the superimposed sub-beams are diffracted once more and reflected back toward the scanning unit.

Furthermore, the graduation periods ($d_R$) of all scanning gratings may be selected as:

$$d_R = d_M \cos \alpha$$

where:
$d_R$:=graduation period of the scanning gratings
$d_M$:=graduation period of the measuring graduation
$\alpha$:=tilt angle of the measuring graduation with respect to the plane of symmetry Moreover, the side of the scanning reticle facing the scale may have provided thereon a combining grating that receives the sub-beams reflected back from the scale and splits them into a plurality of pairs of superimposed sub-beams which propagate in spaced-apart relationship toward a detection unit including a plurality of detector elements for generating phase-shifted scanning signals.

Advantageously, the first and second scanning gratings have different graduation periods, so that, after being reflected a second time at the scale, the sub-beams strike the combining grating at different angles.

Furthermore, a scanning reticle disposed in the scanning unit may be transparent, a first and a second scanning grating being provided on its side facing the scale, and a combining grating being provided on the opposite side, so that:

a beam emitted by a light source strikes the measuring graduation, where it is split into two sub-beams that correspond to two different symmetric diffraction orders and are reflected back in a V-shape to the scanning unit, in the scanning unit, the two reflected-back sub-beams pass through the first and second scanning gratings and propagate toward the combining grating, another diffraction occurs at the combining grating, whereupon a plurality of pairs of superimposed sub-beams propagate toward a detection unit having a plurality of detector elements.

Moreover, the scanning unit may include at least two reflectors and two beam-splitter cubes, so that:

a beam emitted by a light source strikes the measuring graduation, where it is split into two sub-beams that correspond to two different symmetric diffraction orders and are reflected back in a V-shape to the scanning unit, the two reflected-back sub-beams are each deflected by a respective one of the reflectors toward the first beam-splitter cube, where, after passing through optical polarization elements, they are superimposed and propagate on partially toward a detector element and partially toward the second beam-splitter cube, and in the second beam-splitter cube, they are split into at least two further superimposed sub-beams which propagate toward further detector elements, and the split and superimposed sub-beams, prior to striking the detector elements, each pass through further optical polarization elements, so that each of the detector elements can generate phase-shifted scanning signals.

Furthermore, the scanning unit may include at least two reflectors and three beam-splitter cubes, so that:

a beam emitted by a light source is split into two sub-beams in a first beam-splitter cube, the two sub-beams are then each deflected by a respective one of the reflectors toward the measuring graduation, so that they propagate in a V-shape toward the measuring graduation, where they are each split into symmetric diffraction orders, so that collinearly superimposed sub-beams propagate toward the second beam-splitter cube, where, after passing through optical polarization elements, they are superimposed and propagate on partially toward a detector element and partially toward the third beam-splitter cube, and in the third beam-splitter cube, they are split into at least two further superimposed sub-beams which propagate toward further detector elements, and the split and superimposed sub-beams, prior to striking the detector elements, each pass through further optical polarization elements, so that each of the detector elements can generate phase-shifted scanning signals.

Moreover, the scanning unit may include at least two reflectors which deflect the two sub-beams toward the scale and cause them to impinge on the scale symmetrically and at defined angles of incidence with respect to the plane of symmetry, the angles of incidence being selected as:

$$\beta_2 = -\beta_1 = \sin^{-1}\left(\frac{\lambda}{d_M \cdot \cos(\alpha)}\right)$$

where:
$\beta_{1,2}$:=angle of incidence
$\lambda$:=light wavelength
$d_M$:=graduation period of the measuring graduation
$\alpha$:=tilt angle of the measuring graduation with respect to the plane of symmetry For position measurement with an inclined sensitivity vector, the optical position-measuring device according to the present invention now delivers signals having sufficient intensity and allowing for sufficient mounting tolerance. In addition, the measurement is largely insensitive to wavelength variations.

Further details and advantages of the present invention will be described in the following description of exemplary embodiments of the inventive device in conjunction with the figures.

Before describing several exemplary embodiments of the inventive optical position-measuring device in detail with reference to the figures, several terms used in the context of the present invention will be defined.

To this end, reference is once again made to position-measuring devices where, during measurement operation, the sensitivity vector is oriented parallel to the surface of the scale. In such scanning optical systems, a beam emitted by a light source is typically split into two sub-beams. The two sub-beams are diffracted into different diffraction orders at the measuring graduation of the scale, and are eventually superimposed and interfered. In this manner, it is possible to generate phase-shifted scanning signals, from which position values are formed by incremental counting and interpolation. Some such scanning optical systems produce sub-beams which propagate mirror-symmetrically with respect to a plane of symmetry between splitting and superimposition. In this operating mode, the planes of symmetry of such scanning beam paths are perpendicular to the surface of the scale, and therefore also perpendicular to the graduation direction of the measuring graduation of the scale. In this connection, the graduation direction corresponds to the grating vector of the measuring graduation. The grating vector is always oriented perpendicular to the grating lines of the measuring graduation, and, therefore, the terms graduation direction and grating vector will be used interchangeably hereinafter. Because of the mirror symmetry of the scanning beam path, propagation paths of equal length are obtained for the sub-beams between splitting and recombination. Thus, the scanning optical system is achromatic; i.e., the wavelength of the light source as well as its spectral distribution have no influence on the phase and the modulation depth of the scanning signals generated.

Moreover, scanning optical systems in which the sub-beams to be interfered propagate mirror-symmetrically with respect to a plane of symmetry may also be configured such that the "neutral pivot point" of the scanning lies on the scale. In this context, the term "neutral pivot point" refers to that point in space about which either the scanning unit or the scale can be tilted without the displayed position value being changed. In the event of a tilting about the neutral pivot point, the propagation paths traveled by the two sub-beams between splitting and recombination remain equal. Scanning optical systems of this type having mirror-symmetrical sub-beam paths and a neutral pivot point on the scale will hereinafter also be referred to as symmetrical V-type scanning optical systems. This designation thus encompasses all scanning optical systems in which the two sub-beams to be interfered propagate mirror-symmetrically with respect to a plane of symmetry on the one hand, and on the other hand, impinge in a V-shape on a common scanning location on the scale and/or are reflected back by the scale in a V-shape from the scanning location. In this context, the points of incidence of the two sub-beams on the scale must be nearly identical only along the graduation direction or along the grating vector; an offset of the points of incidence perpendicular to the grating vector or along the longitudinal direction of the line-like graduation regions is unimportant.

In addition to such scanning optical systems where the points of incidence of the two sub-beams on the scale are identical or nearly identical along the grating vector, there are further symmetrical scanning optical systems whose neutral pivot point lies on the scale. The Applicant's European Patent Application EP 2 848 899 A2, the disclosure of which is expressly incorporated herein by reference, includes a general description of the relationship between an arbitrary beam path of a scanning optical system and the associated position of the neutral pivot point. Based on this description, it is possible to specify further scanning optical systems having a symmetrical beam path and a neutral pivot point that lies on the scale. All these scanning optical systems will hereinafter also be referred to as symmetrical V-type scanning optical systems.

During operation of such a symmetrical V-type scanning optical system with a sensitivity vector parallel to the scale surface, the scanning unit is aligned with respect to the scale such that the plane of symmetry mentioned above is perpendicular to the surface of the scale and also perpendicular to the grating vector of the measuring graduation of the scale. This is called parallel alignment of the scanning unit and the scale.

Analogously to the approach proposed in the above-discussed German Patent Application DE 10 2015 203 188 A1, the present invention provides that such a symmetrical V-type scanning optical system and the associated plane of symmetry be tilted relative to the scale by a certain tilt angle α about an axis of rotation. The axis of rotation is oriented parallel to the surface of the scale and extends perpendicular to the grating vector of the measuring graduation of the scale; i.e., parallel to the direction of longitudinal extent of the graduation regions of the measuring graduation. Unlike the known position-measuring device described in DE 10 2015 203 188 A1, the disclosure of which is expressly incorporated herein by reference, no interfering sub-beams from non-symmetric diffraction orders are used for signal generation in the present invention. Rather, provision is made to interfere sub-beams which are deflected at the measuring graduation into symmetric diffraction orders, preferably the $+1^{st}$ and $-1^{st}$ diffraction orders resulting at the measuring graduation. This can be achieved by suitably selecting the angle of incidence γ of a beam impinging on the measuring graduation with respect to the plane of symmetry. In other words, provision must be made for oblique illumination. Furthermore, a secondary condition to be observed for the angle of incidence γ in the inventive approach is that this angle of incidence must be selected such that identical optical path lengths are obtained for the sub-beams between splitting and recombination thereof. This also makes it possible to ensure the desired wavelength independence or achromaticity of the position measurement.

A detailed description of these relationships will be given below with reference to several exemplary embodiments of the optical position-measuring device according to the present invention.

Figure 1B:
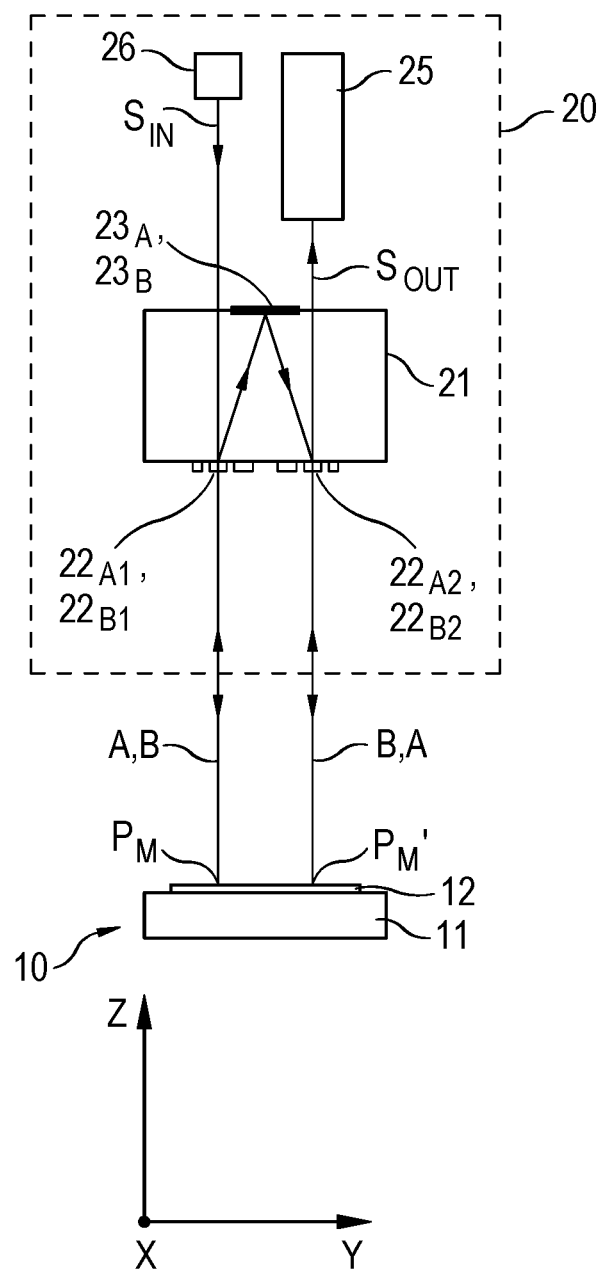
Figure 1C:
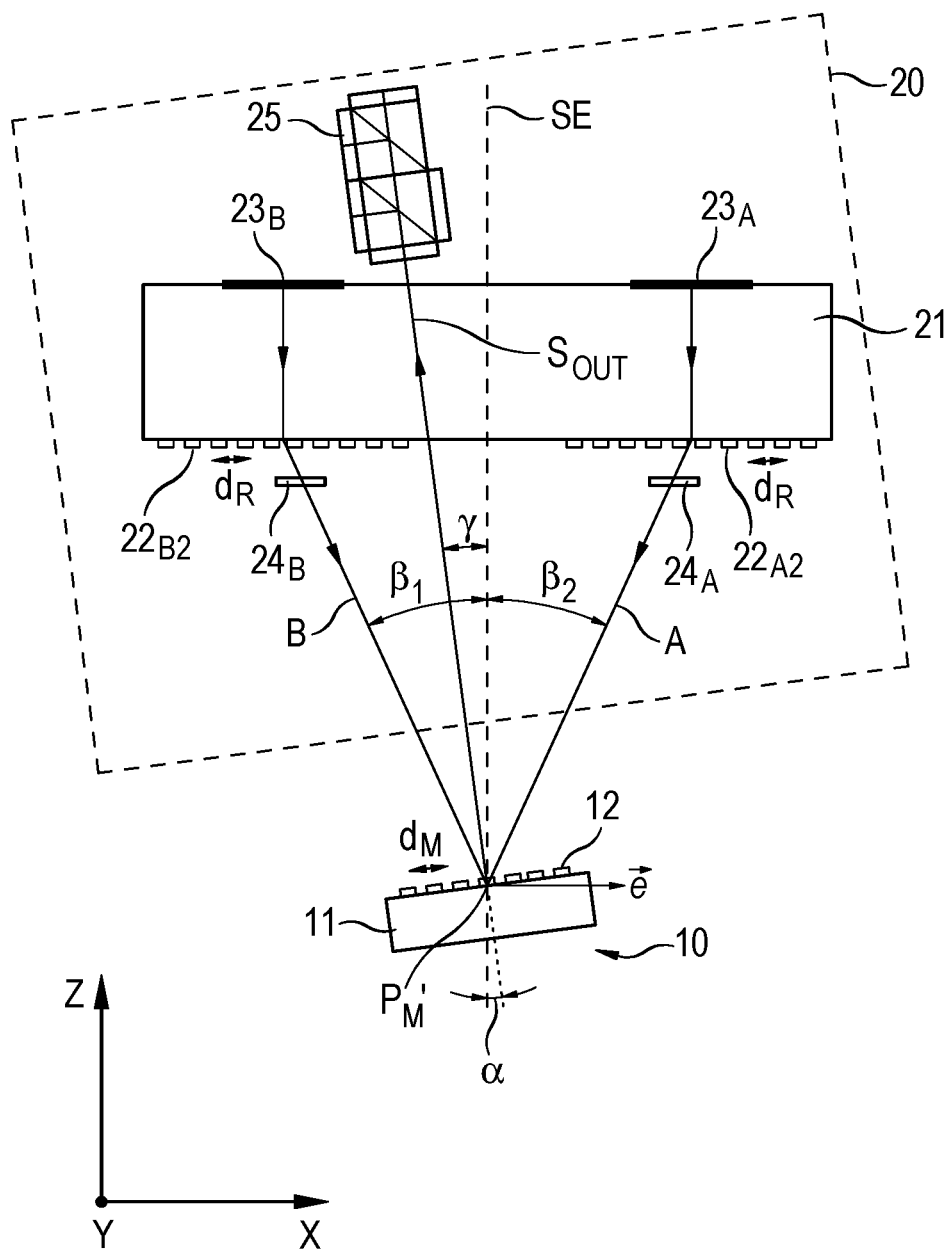

FIGS. 1a, 1b and 1c show in various views the scanning beam path of a first exemplary embodiment of the inventive optical position-measuring device, which has a symmetrical V-type scanning optical system and a sensitivity vector $\vec{e}$ that is inclined with respect the scale surface. FIG. 1a shows the beam trajectory in the xz-plane of the beam $S_{IN}$ coming from a light source up to reflectors $23_A$, $23_B$. FIG. 1c shows, in the same plane, the beam trajectory from reflectors $23_A$, $23_B$ up to the emergent signal beam $S_{OUT}$ containing the superimposed sub-beams, which propagate toward a detector unit 25. FIG. 1b illustrates the entire scanning beam path in the yz-plane. The description will now initially be given with reference to an x'yz' coordinate system whose axes are denoted by x', y and z'. In the each of the figures, x' denotes the graduation direction along which a measuring graduation 12 extends, y denotes the direction that is oriented perpendicular thereto in the plane of the measuring graduation, and z' indicates a direction oriented perpendicular to the plane of the measuring graduation.

The optical position-measuring device illustrated in these figures includes a scale 10 extending along graduation direction x', as well as a scanning unit 20 disposed so as to be movable at least along one direction relative to scale 10. Scale 10 and scanning unit 20 are each connected to objects, e.g., to machine components that are movable relative to each other. The scanning signals generated by the position-measuring device may be used by a downstream machine controller to control the spatial positioning of these machine components.

Scale 10 is composed of a graduation carrier 11 having a measuring graduation 12 disposed on the surface thereof, the measuring graduation including an arrangement of line-like graduation regions along a grating vector or along graduation direction x'. In the figures, the direction of longitudinal extent of the graduation regions corresponds to the y-direction. In the present exemplary embodiment, measuring graduation 12 takes the form of a binary or two-step reflection phase grating having the graduation period $d_M$ and provides a periodic arrangement of alternating graduation regions with different phase-shifting effects for the light incident thereon. The reflective phase grating of measuring graduation 12 is optimized for high diffraction efficiency of the diffraction orders that are used for signal generation; i.e., in the present case, for the $+1^{st}$ and $-1^{st}$ diffraction orders.

Scanning unit 20 contains various optical elements, of which FIGS. 1a-1c show a light source 26, a transparent scanning reticle 21 having reflectors $23_A$, $23_B$ arranged on the top side thereof and first scanning gratings $22_{A1}$, $22_{B1}$ and second scanning gratings $22_{A2}$, $22_{B2}$ arranged on the underside thereof, optical polarization elements $24_A$, $24_B$, as well as a detection unit 25. As an alternative to the embodiment shown, light source 26 and detection unit 25 may also be spaced apart from scanning unit 20 and connected thereto via optical waveguides through which incident beam $S_{IN}$ and emergent signal beam $S_{OUT}$ are then transmitted.

In the position-measuring device according to the present invention, the arrangement and design of the various optical elements in scanning unit 20 ensure that a scanning beam path is obtained in which sub-beams A, B to be interfered propagate mirror-symmetrically with respect to a plane of symmetry SE. The sub-beams either impinge in a V-shape on scale 10 and/or are reflected back in a V-shape from scale 10.

As can be seen in particular from FIGS. 1a and 1c, scanning unit 20; i.e., plane of symmetry SE, is tilted relative to scale 10 by tilt angle α about an axis of rotation in the y-direction, and thus scanning plate 21 provided in scanning unit 20 is also tilted correspondingly, and thus disposed perpendicular to plane of symmetry SE. Tilt angle α refers to the angle between a normal to the scale along the z'-direction and plane of symmetry SE; i.e., the angle of measuring graduation 12 with respect to plane of symmetry SE. Accordingly, the corresponding axis of rotation in the y-direction is oriented parallel to the surface of scale 10 and extends perpendicular to the grating vector of measuring graduation 12, which is oriented in the x'-direction. The further description will now be given with reference to a coordinate system xyz rotated about tilt angle α, in which the scale 10 is tilted by tilt angle α instead of scanning reticle 21.

Unlike the known system described in DE 10 2015 203 188 A1, it is here further provided that the beam $S_{IN}$ coming from light source 26 be incident at an angle of incidence γ with respect to plane of symmetry SE. After passing undeflected through transparent scanning reticle 21, beam $S_{IN}$ impinges a first time on measuring graduation 12 of scale 12 at first point of incidence $P_M$, where it is split into two sub-beams A, B which are reflected back in a V-shape to scanning unit 20. In the process, incident beam $S_{IN}$ is split into symmetric diffraction orders $n_{A1}$=+1 and $n_{B1}$=−1, which later constitute the sub-beams A, B used for signal generation.

For a given angle of incidence γ, the following relation 1) is derived for the diffraction angles $β_{2, 1}$ of the two first diffraction orders ($nA_1$=+1, $nB_1$=−1) reflected at scale 10 or measuring graduation 12:

$$β_{2,1}=(\sin^{-1}(\sin(γ-a)±k)-α \qquad \text{(equation 1)}$$

where:
$β_1$:=diffraction angle of the $-1^{st}$ order diffraction at the scale
$β_2$:=diffraction angle of the $+1^{st}$ order diffraction at the scale
α:=tilt angle of the measuring graduation with respect to the plane of symmetry
γ:=angle of incidence of the incident beam with respect to the plane of symmetry
k:=λ/$d_M$
λ:=light wavelength
$d_M$:=graduation period of the measuring graduation As mentioned earlier, the present invention ensures that the position measurement is independent of wavelength. To this end, provision is made for the interfering sub-beams A, B to travel identical optical path lengths between splitting and recombination. This can be ensured by suitably selecting the angle of incidence γ of incident beam $S_{IN}$ with respect to plane of symmetry SE. Using equation 1) and under the condition that $β_1$=−$β_2$ (diffraction angles have identical absolute values), the following is derived for the angle of incidence γ:

$$γ = \sin^{-1}\left(\sqrt{1 - \frac{k^2}{1 - \sin(α)^2}} \cdot \sin(α)\right) + α \qquad \text{(equation 2)}$$

where:
γ:=angle of incidence of the incident beam with respect to the plane of symmetry
k:=λ/$d_M$
λ:=light wavelength
$d_M$:=graduation period of the measuring graduation
α:=tilt angle of the measuring graduation with respect to the plane of symmetry The sub-beams A, B diffracted and reflected back by measuring graduation 12 then propagate to first scanning gratings $22_{A1}$ and $22_{B1}$, respectively, on the underside of transparent scanning reticle 21 and pass therethrough. The two first scanning gratings $22_{A1}$ and $22_{B1}$ combine several optical functions in one common diffractive structure.

Due to a deflection effect oriented anti-parallel to the direction of incidence, sub-beams A, B are then directed by first scanning gratings $22_{A1}$ and $22_{B1}$ into the z-direction in the xz-projection (FIG. 1a). The graduation period $d_R$ required of scanning gratings $22_{A1}$ and $22_{B1}$ to achieve this deflection effect is preferably selected according to the following relation 3):

$$d_R=d_M·\cos α \qquad \text{(equation 3)}$$

where:
$d_R$:=graduation period according to the deflection effect of the scanning gratings
$d_M$:=graduation period of the measuring graduation
α:=tilt angle of the measuring graduation with respect to the plane of symmetry In the yz-projection (FIG. 1b), sub-beams A, B are partially focused by a cylindrical-lens function of first scanning gratings $22_{A1}$ and $22_{B1}$ onto reflectors $23_A$, $23_B$ on the top side of scanning reticle 21, a focusing effect resulting only perpendicular to direction x, along the y-direction. The sub-beams A, B deflected and partially focused in this way then each strike a respective one of reflectors $23_A$, $23_B$, from where they are reflected there back toward scale 10. After being reflected at reflectors $23_A$, $23_B$, the two sub-beams pass through the two second scanning gratings $22_{A2}$, $22_{B2}$, which likewise are disposed on the underside of scanning reticle 21. The two second scanning gratings $22_{A2}$, $22_{B2}$ each combine optical functions equivalent to those of the two first scanning gratings $22_{A1}$, $22_{B1}$. For instance, they recollimate sub-beams A, B by a cylindrical-lens function in the yz-projection (FIG. 1b), and direct them in the xz-projection (FIG. 1c) back to one common point of incidence $P_M'$ on scale 10, i.e., on measuring graduation 12. In the process, the two sub-beams A, B propagate in a V-shape toward scale 10; i.e., toward a second point of incidence $P_M'$. There, they are re-diffracted into symmetric diffraction orders ($n_{A2}$=+1 and $n_{B2}$=+1) and thereby superimposed, interfered, and then propagate in signal beam $S_{OUT}$ toward scanning unit 20 and detection unit 25, where a plurality of periodic, phase-shifted scanning signals are obtained from signal beam $S_{OUT}$.

In this exemplary embodiment, the generation of the phase-shifted scanning signals is accomplished with the aid of optical polarization elements. The beam $S_{IN}$ emitted by light source 26 (e.g., a laser) is linearly polarized. In each of the two beam paths of split sub-beams A, B; i.e., in the respective interferometer arms, a respective λ/4 plate $24_A$, $24_B$ is disposed between measuring graduation 12 and scanning reticle 21, the sub-beams A, B being right-circularly polarized and left-circularly polarized, respectively, by the respective λ/4 plates. Upon recombination of sub-beams A, B at second point of incidence $P_M'$, they are split by a beam splitter into three interference beams which are then passed through differently oriented polarizers onto detector elements, which finally generate the phase-shifted scanning signals. In FIGS. 1b, 1c, reference numeral 25 denotes the detection unit including the beam splitter, the polarizers as well as the individual detector elements.

In the position-measuring device according to the present invention, the sensitivity vector of $\vec{e}$ the scanning extends parallel to scanning reticle 21 and obliquely relative to scale 10, as can be seen from FIGS. 1a, 1c. In this manner, it is possible to generate position-dependent scanning signals both for the relative movement of scanning unit 20 and scale 10 along graduation direction x' or along the grating vector of measuring graduation 12 oriented in the x'-direction, and along the direction z' perpendicular thereto.

In this connection, if scanning unit 20 is moved parallel to the scale surface; i.e., in direction x', then the signal period $SP_{x'}$ of the scanning signals relating to this measurement direction is one-fourth of the graduation period $d_M$ of measuring graduation 12, that is:

$$SP_{x'}=¼·d_M \qquad \text{(equation 4)}$$

where:
$SP_{x'}$: signal period of the scanning signals in the case of relative movement in the x'-direction
$d_M$:=graduation period of the measuring graduation In the case of movement of scanning unit 20 along a normal to scale 10; i.e., in direction z', signal period $SP_{z'}$ is derived as $$SP_{z'} = \frac{d_M}{4 \cdot \tan(\alpha)} \quad \text{(equation 5)}$$

$SP_{z'}$: signal period of the scanning signals in the case of relative movement in the z'-direction
$d_M$:=graduation period of the measuring graduation
$\alpha$:=tilt angle of the measuring graduation with respect to the plane of symmetry A second exemplary embodiment of the optical position-measuring device according to the present invention will be described below with reference to FIGS. 2a-2c. In the various figures, the various portions of the scanning beam path are illustrated analogously to the first exemplary embodiment. In the following, essentially only the most important differences from the first exemplary embodiment will be discussed. These differences reside primarily in the manner in which the phase-shifted scanning signals are generated. Here, no provision is made to generate scanning signals using optical polarization. Rather, this is accomplished using a combining grating 128 which is disposed on the underside of scanning reticle 121 and whose graduation period is significantly larger than the graduation period $d_M$ of the measuring graduation. In comparison with the first exemplary embodiment, this eliminates the need for the optical polarization elements provided in the scanning beam path thereof, such as λ/4 plates and polarizers.

Figure 2A:
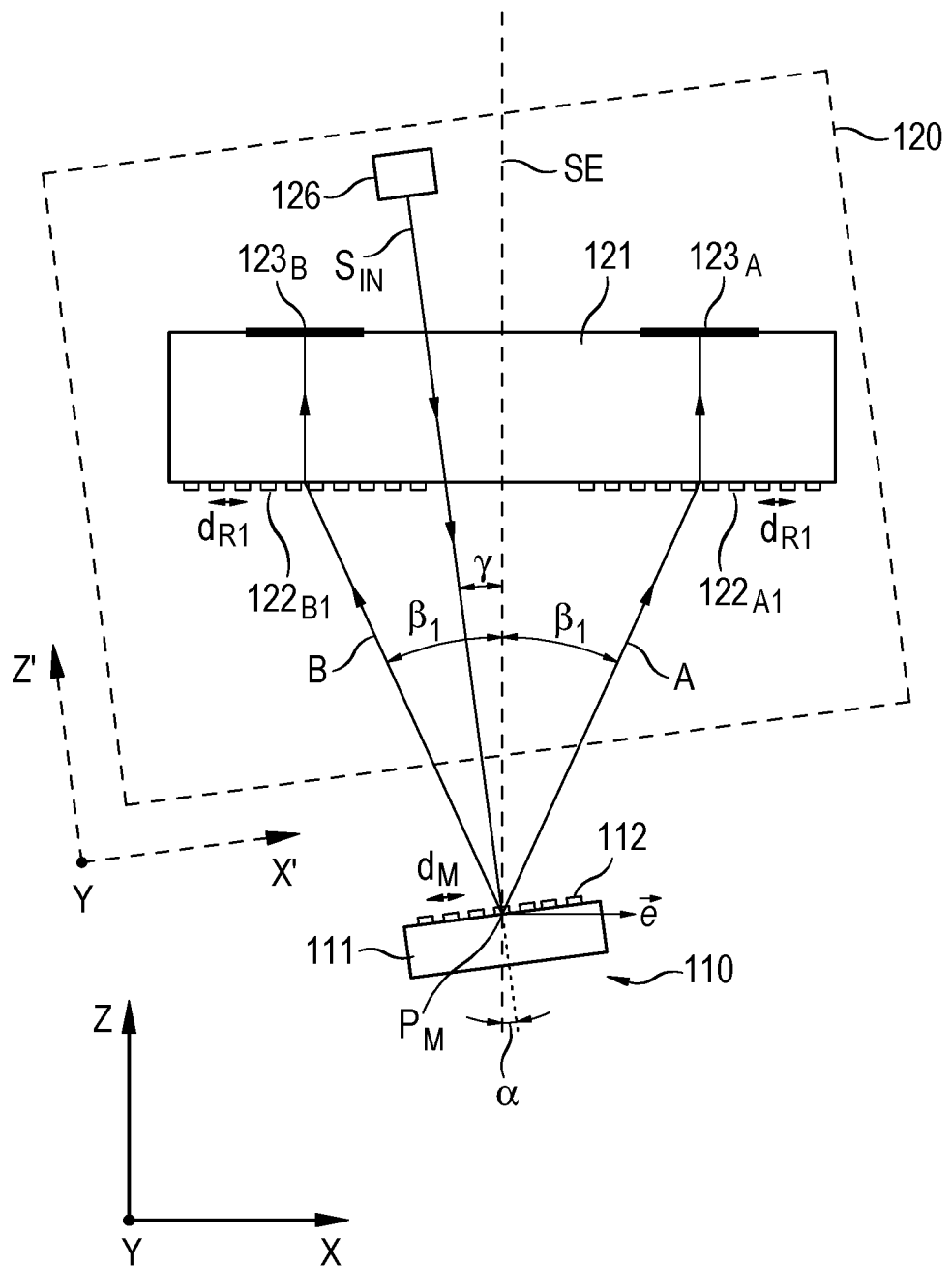
FIGS. 2a-2c are schematic cross-sectional views of a second exemplary embodiment of the inventive optical position-measuring device with an inclined sensitivity vector.
Figure 2B:
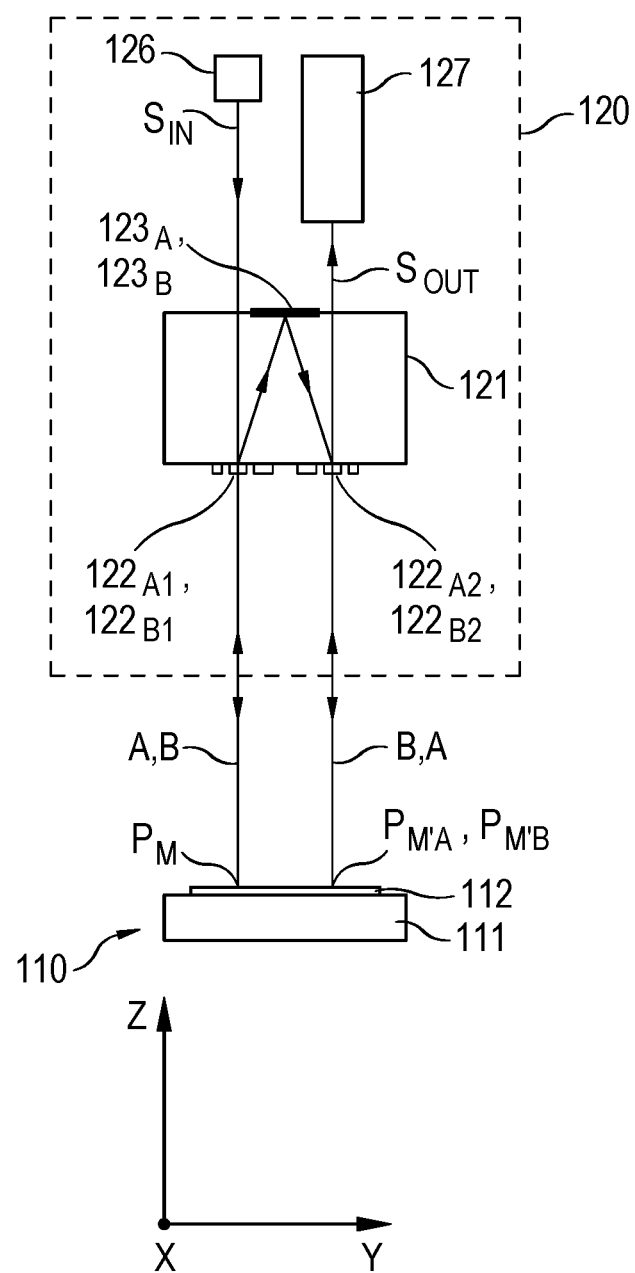
Figure 2C:
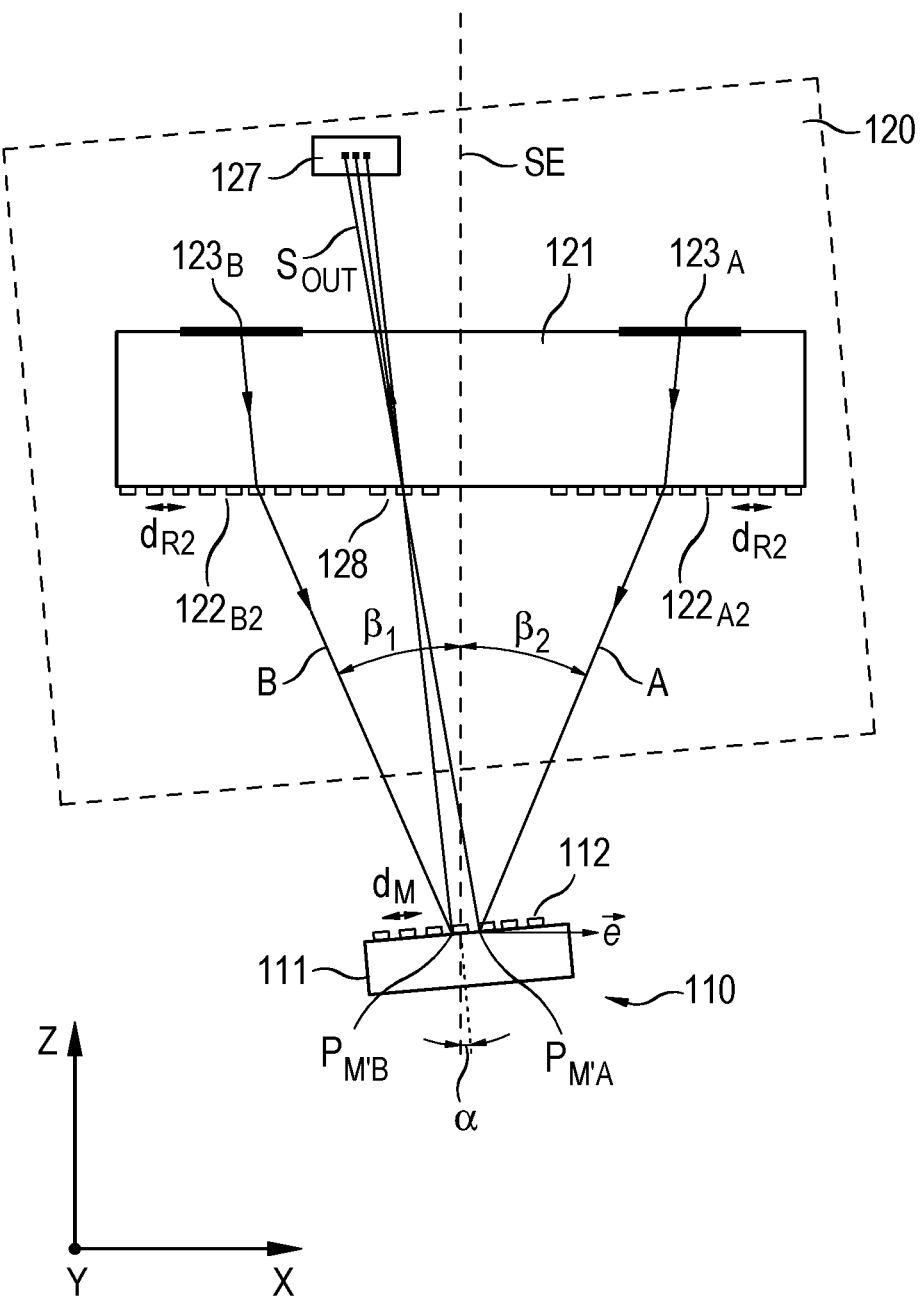

The portion of the scanning beam path from light source 126 to reflectors 123$_A$, 123$_B$, shown in FIG. 2a, is nearly identical to the scanning beam path of the first exemplary embodiment of FIG. 1a. Only the deflection functions of the first scanning gratings 122$_{A1}$ and 122$_{B1}$ are slightly stronger or weaker, so that the sub-beams A, B propagate somewhat obliquely but symmetrically with respect to plane of symmetry SE within scanning reticle 121. After being reflected back by reflectors 123$_A$, 123$_B$, sub-beams A, B arrive at second points of incidence P$_{M'A}$ and P$_{M'B}$ on scale 110, as shown in FIG. 2c and analogously to the first exemplary embodiment, except that passage through λ/4 plates is omitted here. Then, the diffracted sub-beams are reflected back from second points of incidence P$_{M'A}$ and P$_{M'B}$ on scale 110 toward combining grating 128.

As another difference from the first embodiment, provision is made here that the graduation period $d_{R1}$ of first scanning gratings 122$_{A1}$, 122$_{B1}$ on the underside of scanning reticle 121, which are traversed first, differ from the graduation period $d_{R2}$ of the subsequently traversed second scanning gratings 122A$_2$, 122B$_2$. This ensures that sub-beams A, B impinge at different angles at the same point on combining grating 128 after they have been reflected a second time at scale 110. If the graduation period of combining grating 128 is selected such that the direction of the $+1^{th}$ diffraction order of one interferometer arm coincides with the direction of the $-1^{th}$ diffraction order of the other interferometer arm, then sub-beams A, B interfere completely with each other. Then, the $0^{th}$ diffraction order of one sub-beam and the $+2^{nd}$ diffraction order of the other sub-beam automatically have the same direction. The same is true for the $-2^{nd}$ diffraction order of one interferometer arm and the 0th diffraction order of the other interferometer arm. In this way, a total of three beams containing phase-shifted scanning signals are obtained in signal beam $S_{OUT}$ downstream of combining grating 128. In each instance, sub-beams of different diffraction orders are superimposed. With the aid of three detector elements in detection unit 127, the scanning signals are converted into electrical signals and interconnected in such a way that two 90° phase-shifted, direct current component-free scanning signals are present at the output.

In this exemplary embodiment, the exact symmetry of the two sub-beams A, B is violated in the last portion between scale 110 and combining grating 128. Because of this, the optical path lengths of the two sub-beams A, B are only nearly identical and, as a result, the desired achromaticity of the position-measuring device is only approximately achieved. The achromaticity of the position-measuring device can be restored at least for a specific distance between scale 110 and scanning reticle 121 if the distance is pre-compensated for by a defined asymmetry between sub-beams A, B. This may be implemented, for example, by selecting different values for grating constants $d_{R1A}$ and $d_{R1B}$ and thus also for grating constants $d_{R2A}$ and $d_{R2B}$. Because of this, different angles and thus different path lengths result for the two sub-beams A, B within scanning reticle 121.

In a modification of the second exemplary embodiment, it may be provided to dispose what is known as a structured photodetector instead of combining grating 128 in the scanning beam path, and to sense the fringe pattern produced in this plane. The structured photodetector is composed of a periodic arrangement of detector elements along measurement direction x and allows generation in known manner of three or four phase-shifted scanning signals. In this case, the structured photodetector would function as the detection unit.

Figure 3:
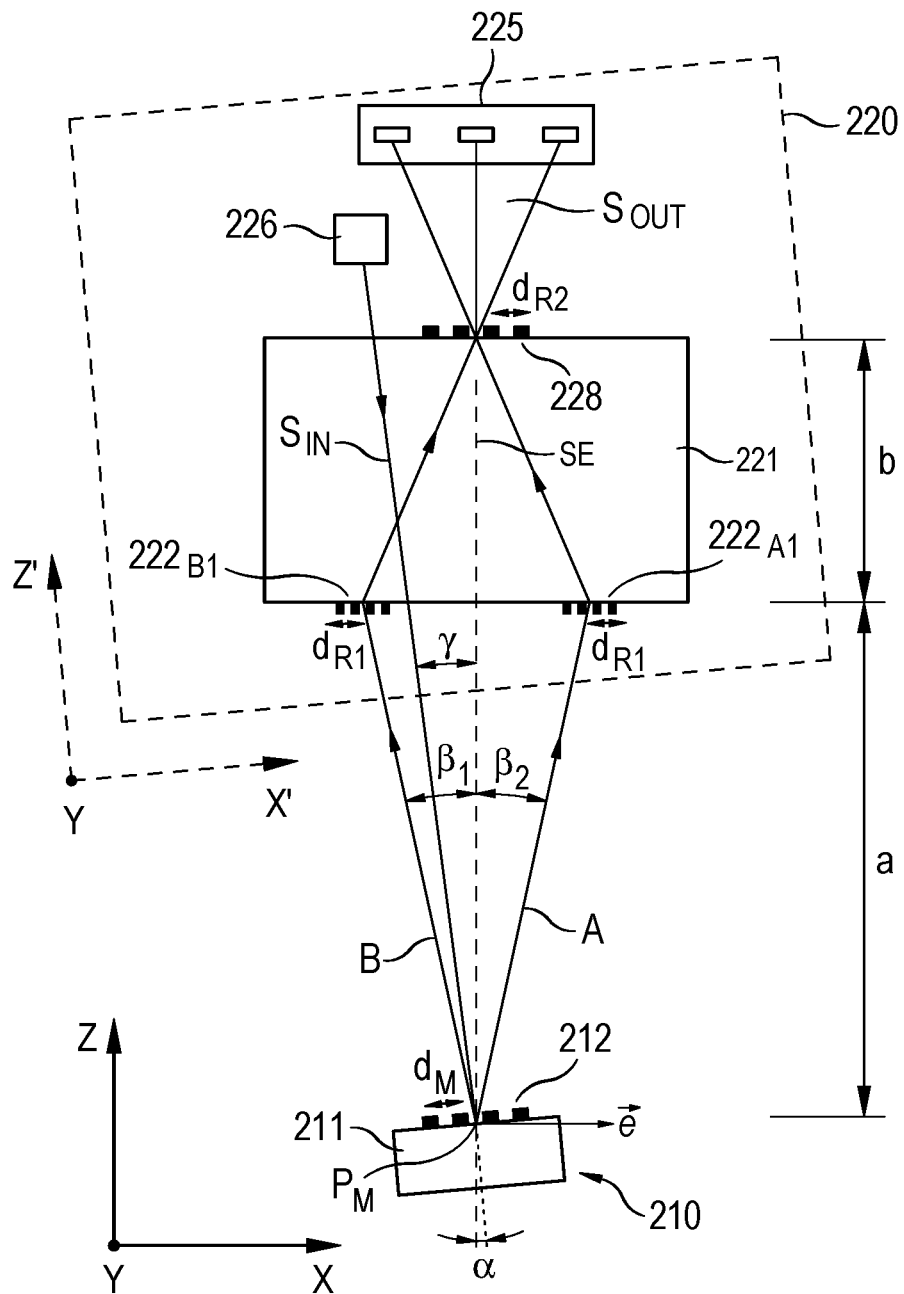
FIG. 3 is a schematic cross-sectional view of a third exemplary embodiment of the inventive optical position-measuring device with an inclined sensitivity vector.

FIG. 3 shows, in schematic cross-sectional view, the xz-plane of a third exemplary embodiment of the inventive optical position-measuring device with an inclined sensitivity vector $\vec{e}$. As in the examples to follow, only the most important differences from the preceding exemplary embodiments will be discussed hereinafter.

Here, apart from the omission of optical polarization components, provision is made only for a single scanning of scale 210. This means that the obliquely incident beam $S_{IN}$ from light source 226 impinges only once at point of incidence $P_M$ on measuring graduation 212; i.e., on scale 210.

Given an intended tilt of sensitivity vector $\vec{e}$ about tilt angle α, the desired achromaticity of the scanning optical system is achieved when the two angles of incidence $\beta_1$ and $\beta_2$ of the sub-beams A, B reflected back from scale 210 onto scanning reticle 221 have identical absolute values. Accordingly, the angle of incidence γ of the beam $S_{IN}$ with respect to plane of symmetry SE can be determined by the above equation 2).

The two sub-beams A, B diffracted by the scale and reflected back toward scanning unit 220 are deflected back toward plane of symmetry SE by scanning gratings 222$_{A1}$, 222$_{B1}$ and meet at combining grating 228, which is disposed on the top side of scanning reticle 221. The graduation period $d_{R2}$ of combining grating 228 is preferably selected as follows:

$$d_{R2} = d_M \cdot \cos\alpha \frac{\sqrt{b^2 + (a^2 - b^2)\left(\frac{\lambda}{d_M \cdot \cos\alpha}\right)^2}}{a \cdot n_r} \quad \text{(equation 6)}$$

where:
$d_{R2}$:=graduation period of the combining grating
$d_M$:=graduation period of the measuring graduation
α:=tilt angle of the measuring graduation with respect to the plane of symmetry
a:=distance between the measuring graduation and the scanning gratings
b:=distance between the scanning gratings and the combining grating
λ:=light wavelength
$n_r$:=refractive index of the medium between the scanning gratings and the combining grating Using equation 6), the periodicity or graduation period $d_{R1}$ of the two scanning gratings $222_{A1}$, $222_{B1}$ of this exemplary embodiment is derived as follows:

$$d_{R1} = \left( \frac{1}{d_M \cdot \cos\alpha} + \frac{1}{d_{R2}} \right)^{-1} \quad \text{(equation 7)}$$

where:
$d_{R1}$:=graduation period of the scanning gratings
$d_M$:=graduation period of the measuring graduation
α:=tilt angle of the measuring graduation with respect to the plane of symmetry
$d_{R2}$:=graduation period of the combining grating Upon recombination of sub-beams A, B at combining grating 228, superimposed pairs of sub-beams propagate in signal beam $S_{OUT}$ toward detection unit 225, where the phase-shifted scanning signals are generated by a plurality of detector elements.

As can be seen from FIG. 3, in this exemplary embodiment, the sensitivity vector $\vec{e}$ of the scanning extends parallel to scanning reticle 221 and obliquely with respect to scale 210, which makes it possible to generate position-dependent signals along both the x'-direction and the z'-direction.

Figure 4:
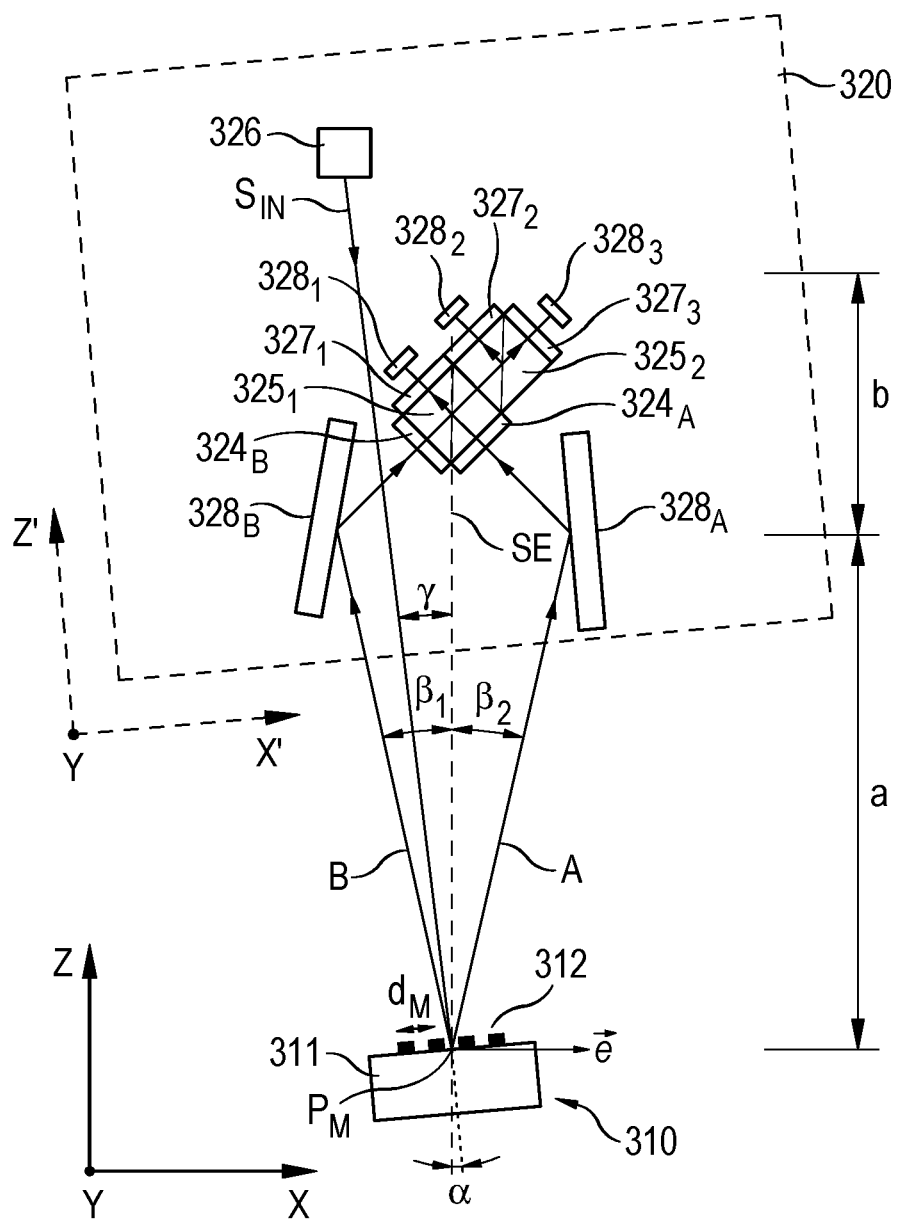
FIG. 4 is a schematic cross-sectional view of a fourth exemplary embodiment of the inventive optical position-measuring device with an inclined sensitivity vector.

If scanning unit 220 is moved parallel to the scale surface; i.e., in direction x', then the resulting signal period SPx' of the scanning signals is equal to half the graduation period $d_M$ of the measuring graduation:

$$SP_{x'} = \tfrac{1}{2} \cdot d_M \quad \text{(equation 8)}$$

where:
$SP_{x'}$: signal period of the scanning signals in the case of relative movement in the x'-direction
$d_M$:=graduation period of the measuring graduation In the case of movement of scanning unit 220 along a normal to scale 210; i.e., in direction z', the signal period of the scanning signals is:

$$SP_{z'} = \frac{d_M}{2 \cdot \tan(\alpha)} \quad \text{(equation 9)}$$

where:
$SP_{z'}$:=signal period of the scanning signals in the case of relative movement in the z'-direction
$d_M$:=graduation period of the measuring graduation
α:=tilt angle of the measuring graduation with respect to the plane of symmetry FIG. 4 shows, in schematic cross-sectional view, the xz-plane of a fourth exemplary embodiment of the inventive optical position-measuring device with an inclined sensitivity vector $\vec{e}$.

The beam $S_{IN}$ emitted by a laser light source 326 and incident at an angle of incidence γ with respect to plane of symmetry SE is linearly polarized. It impinges on measuring graduation 312 of scale 310 at point of incidence $P_M$, where it is reflectively diffracted into the $+1^{st}$ and $-1^{st}$ diffraction orders. Then, the two split sub-beams A, B impinge on respective reflectors $328_A$, $328_B$ in the form of plane mirrors, whereby they are deflected toward a first beam-splitter cube $325_1$. Prior to arriving at first beam-splitter cube $325_1$, sub-beams A, B pass through respective λ/4 plates $324_A$, $324_B$, whereby they are left-circularly polarized and right-circularly polarized, respectively. In first beam-splitter cube $325_1$, sub-beams A, B are superimposed, whereupon they propagate partially toward a detector element $328_1$ and partially toward a second beam-splitter cube $325_2$. In second beam-splitter cube $325_2$, sub-beams A, B are once more split into two further sub-beam pairs. Prior to arriving at three detector elements $328_1$-$328_3$, the three sub-beam pairs produced in this manner eventually pass through three polarizers $327_1$-$327_3$, which are disposed on the two beam-splitter cubes $325_1$, $325_2$ as illustrated in FIG. 4. The detector elements then generate phase-shifted scanning signals whose relative phase difference is set to 120° by the orientation of polarizers $327_1$-$327_3$, respectively.

In the exemplary embodiment as well, the position measurement is achromatic, because the optical paths traveled by sub-beams A, B between splitting and recombination have the same length. This is ensured here by the beam paths of the two sub-beams A, B being symmetrical with respect to the optical axis and plane of symmetry SE between scale 310 and first beam-splitter cube $325_1$. Angle of incidence γ is again selected according to the above equation 2). The two reflectors $328_A$ and $328_B$ are arranged symmetrically with respect to plane of symmetry SE.

Figure 5:
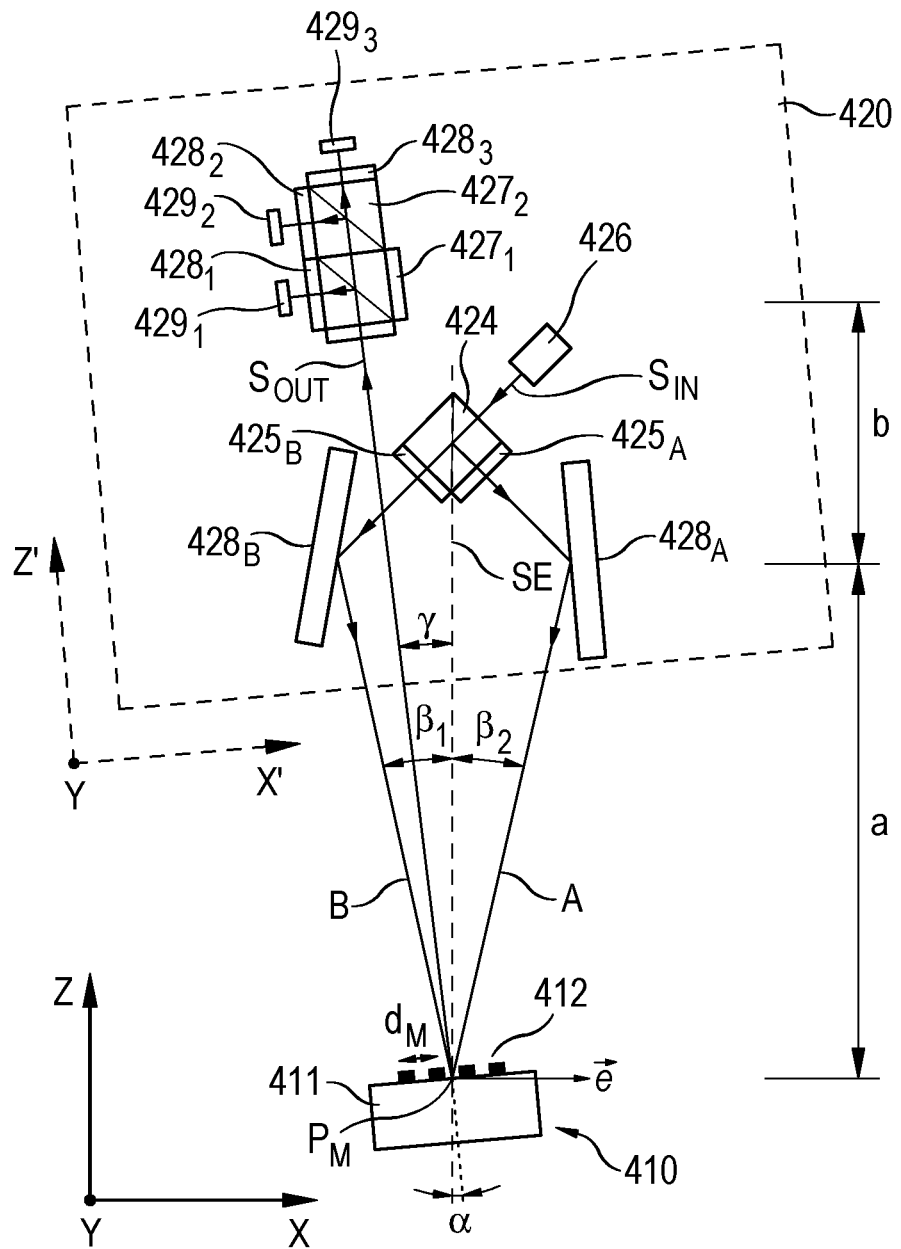
FIG. 5 is a schematic cross-sectional view of a fifth exemplary embodiment of the inventive optical position-measuring device with an inclined sensitivity vector.

Finally, a fifth exemplary embodiment of the inventive optical position-measuring device with an inclined sensitivity vector $\vec{e}$ will be described with reference to the schematic cross-sectional view of FIG. 5, which illustrates the scanning beam path in the xz-plane.

The fifth exemplary embodiment is configured substantially analogously to the fourth exemplary embodiment. The essential difference resides in the generally reverse beam direction in the scanning beam path. Accordingly, in the fifth exemplary embodiment, the beam $S_{IN}$ emitted by a light source 426 is split by a beam-splitter cube 424 into two sub-beams A, B, which are right-circularly polarized and left-circularly polarized by λ/4 plates $425_A$, $425_B$, respectively. Then, the two sub-beams A, B are deflected by reflectors $428_A$, $428_B$ toward scale 410, where they impinge on measuring graduation 412 at point of incidence $P_M$. The beam path of the two sub-beams A, B between beam-splitter cube 424 and scale 410 is symmetrical with respect to the optical axis and plane of symmetry SE, and thus is achromatic. In this case, the illumination angles or angles of incidence $\beta_2$ and $\beta_1$ have to be selected as:

$$\beta_2 = -\beta_1 = \sin^{-1}\left( \frac{\lambda}{d_M \cdot \cos(\alpha)} \right) \quad \text{(equation 10)}$$

where:
$\beta_{1,2}$:=angle of incidence
λ:=light wavelength
$d_M$:=graduation period of the measuring graduation
α:=tilt angle of the measuring graduation with respect to the plane of symmetry At scale 410; i.e., at measuring graduation 412 provided there, sub-beams A, B are reflectively diffracted into the $+1^{st}$ and $-1^{st}$ diffraction orders and thereby collinearly superimposed. The superimposed sub-beams arrive at the two further beam-splitter cubes $427_1$, $427_2$, where they are split into three superimposed sub-beams. Analogously to the previous exemplary embodiment, they are directed by polarizers $428_1$-$428_3$ onto three detector elements $429_1$-$429_3$, where three 120° phase-shifted scanning signals are generated.

In addition to the exemplary embodiments described herein, other embodiments are of course possible within the scope of the present invention.

For example, instead of the above-described position-measuring devices for measuring linear movements, position-measuring devices for measuring rotary movements may, of course, also be configured in accordance with the present invention. The corresponding measuring graduations are then configured as radial graduations or as cylindrical graduations.

Other measuring graduations that may be used in the inventive position-measuring device include two dimensional structures in the form of what is generally known as "cross-grating graduations."

Due to the achromaticity of the scanning in accordance with embodiments of the present invention, it is also possible to use LEDs or SLEDs instead of laser diodes as light sources.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for sensing a position of two relatively movable objects, the optical position-measuring device comprising:
a scale connected to one of the two objects and having a measuring graduation including a periodic arrangement of graduation regions along at least one graduation direction; and
a scanning unit disposed on the other one of the two objects and having a plurality of optical elements, an arrangement and design of the optical elements of the scanning unit resulting in a scanning beam path in which split and subsequently interfered sub-beams propagate mirror-symmetrically with respect to a plane of symmetry and impinge in a V-shape on the scale and/or are reflected back in a V-shape from the scale, wherein the plane of symmetry is tilted by a defined tilt angle relative to the scale about an axis of rotation that is oriented parallel to a surface of the scale and extends perpendicular to the graduation direction, the sub-beams that are interfered being deflected at the measuring graduation into symmetric diffraction orders, and
wherein the sub-beams travel identical optical path lengths between splitting and recombination.

2. The optical position-measuring device as recited in claim 1, wherein sub-beams resulting from the $+1^{st}$ and $-1^{st}$ diffraction orders at the measuring graduation are interfered.

3. The optical position-measuring device as recited in claim 1, wherein the measuring graduation is in a form of a reflection phase grating that is optimized for high diffraction efficiency of diffraction orders that are used for signal generation.

4. The optical position-measuring device as recited in claim 1, wherein the angle of incidence of a beam impinging on the measuring graduation with respect to the plane of symmetry is selected such that the identical optical path lengths are obtained for the sub-beams between splitting and recombination.

5. The optical position-measuring device as recited in claim 4, wherein the scanning unit includes at least one scanning reticle having a plurality of optical elements, the scanning reticle being disposed perpendicular to the plane of symmetry.

6. The optical position-measuring device as recited in claim 4, wherein the angle of incidence of the beam impinging on the measuring graduation with respect to the plane of symmetry is selected as:

$$\gamma = \sin^{-1}\left(\sqrt{1 - \frac{k^2}{1 - \sin(\alpha)^2}} \cdot \sin(\alpha)\right) + \alpha$$

where:
γ:=the angle of incidence of the beam impinging on the measuring graduation with respect to the plane of symmetry
$k := \lambda/d_M$
λ:=light wavelength
$d_M$:=graduation period of the measuring graduation
α:=the tilt angle of the measuring graduation with respect to the plane of symmetry.

7. The optical position-measuring device as recited in claim 1, wherein a scanning reticle disposed in the scanning unit is transparent, two first and two second scanning gratings being provided on a side of the scanning reticle facing the scale, and two reflectors being provided on the opposite side with reflecting surfaces of the reflectors being oriented toward the scale.

8. The optical position-measuring device as recited in claim 7, wherein the scanning unit is configured such that:
a beam emitted by a light source strikes the measuring graduation, where the beam is split into two sub-beams that correspond to two different symmetric diffraction orders and are reflected back in a V-shape to the scanning unit;

in the scanning unit, the two reflected-back sub-beams pass through the two first scanning gratings toward the two reflectors, and in so doing, experience a deflection effect oriented anti-parallel to the direction of incidence as well as only a focusing effect perpendicular to the graduation direction;

the sub-beams so deflected and focused then impinge on the respective reflectors and are reflected back toward the scale;

the two reflected-back sub-beams then pass through the two second scanning gratings toward the scale, and in so doing, experience a deflection effect in the graduation direction as well as only a collimating effect perpendicular to the graduation direction, so that the two sub-beams then propagate in a V-shape toward the scale, where the superimposed sub-beams are diffracted once more and reflected back toward the scanning unit.

9. The optical position-measuring device as recited in claim 7, wherein graduation periods of all the scanning gratings are selected as:

$$d_R = d_M \cdot \cos \alpha$$

where:
$d_R$ := graduation period of the scanning gratings
$d_M$ := graduation period of the measuring graduation
$\alpha$ := the tilt angle of the measuring graduation with respect to the plane of symmetry.

10. The optical position-measuring device as recited in claim 8, wherein the side of the scanning reticle facing the scale further has provided thereon a combining grating that receives the sub-beams reflected back from the scale and splits the sub-beams into a plurality of pairs of superimposed sub-beams which propagate in a spaced-apart relationship toward a detection unit including a plurality of detector elements configured to generate phase-shifted scanning signals.

11. The optical position-measuring device as recited in claim 10, wherein the first and second scanning gratings have different graduation periods, so that, after being reflected a second time at the scale, the sub-beams strike the combining grating at different angles.

12. The optical position-measuring device as recited in claim 1, wherein a scanning reticle disposed in the scanning unit is transparent, a first and a second scanning grating being provided on a side of the scanning reticle facing the scale, and a combining grating being provided on the opposite side, so that:

a beam emitted by a light source strikes the measuring graduation, where the beam is split into two sub-beams that correspond to two different symmetric diffraction orders and are reflected back in a V-shape to the scanning unit;

in the scanning unit, the two reflected-back sub-beams pass through the first and second scanning gratings and propagate toward the combining grating; and another diffraction occurs at the combining grating, whereupon a plurality of pairs of superimposed sub-beams propagate toward a detection unit having a plurality of detector elements.

13. The optical position-measuring device as recited in claim 1, wherein the scanning unit includes at least two reflectors and two beam-splitter cubes, so that:

a beam emitted by a light source strikes the measuring graduation, where the beam is split into two sub-beams that correspond to two different symmetric diffraction orders and are reflected back in a V-shape to the scanning unit;

the two reflected-back sub-beams are each deflected by a respective one of the reflectors toward a first one of the two beam-splitter cubes, where, after passing through optical polarization elements, the sub-beams are superimposed and propagate on partially toward a detector element and partially toward a second one of the two beam-splitter cubes;

in the second beam-splitter cube, the sub-beams are split into at least two further superimposed sub-beams which propagate toward further detector elements; and the split and superimposed sub-beams, prior to striking the detector elements, each pass through further optical polarization elements, so that each of the detector elements are operable to generate phase-shifted scanning signals.

14. The optical position-measuring device as recited in claim 1, wherein the scanning unit includes at least two reflectors and three beam-splitter cubes, so that:

a beam emitted by a light source is split into two sub-beams in a first one of the three beam-splitter cubes;

the two sub-beams are then each deflected by a respective one of the reflectors toward the measuring graduation, so that the sub-beams propagate in a V-shape toward the measuring graduation, where the sub-beams are each split into symmetric diffraction orders, so that collinearly superimposed sub-beams propagate toward a second one of the three beam-splitter cubes, where, after passing through optical polarization elements, the sub-beams are superimposed and propagate on partially toward a detector element and partially toward a third one of the beam-splitter cubes;

in the third beam-splitter cube, the sub-beams are split into at least two further superimposed sub-beams which propagate toward further detector elements; and the split and superimposed sub-beams, prior to striking the detector elements, each pass through further optical polarization elements, so that each of the detector elements are operable to generate phase-shifted scanning signals.

15. The optical position-measuring device as recited in claim 1, wherein the scanning unit includes at least two reflectors which deflect the two sub-beams toward the scale and cause the sub-beams to impinge on the scale symmetrically and at defined angles of incidence with respect to the plane of symmetry, the angles of incidence being selected as:

$$\beta_2 = -\beta_1 = \sin^{-1}\left(\frac{\lambda}{d_M \cdot \cos(\alpha)}\right)$$

where:
$\beta_{1,2}$ := the angles of incidence
$\lambda$ := light wavelength
$d_M$ := graduation period of the measuring graduation
$\alpha$ := the tilt angle of the measuring graduation with respect to the plane of symmetry.

* * * * *